March 9, 1965
W. A. RUTLEDGE
3,172,197
METHOD OF ACHIEVING ALIGNMENT OF BALL
BEARINGS AND SHAFT COMPONENTS
Filed June 14, 1963
2 Sheets-Sheet 1
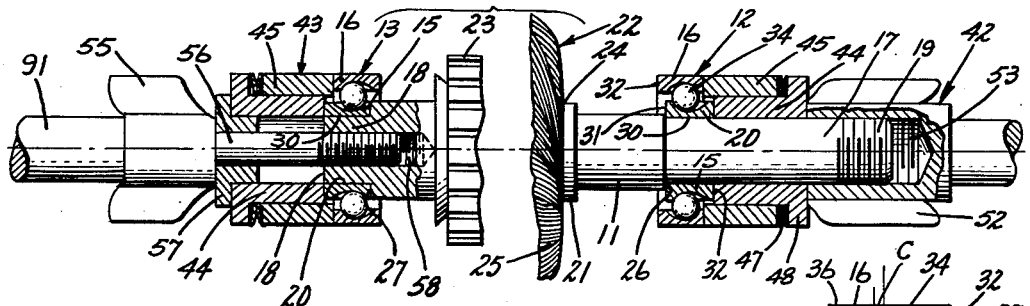
Fig.1.
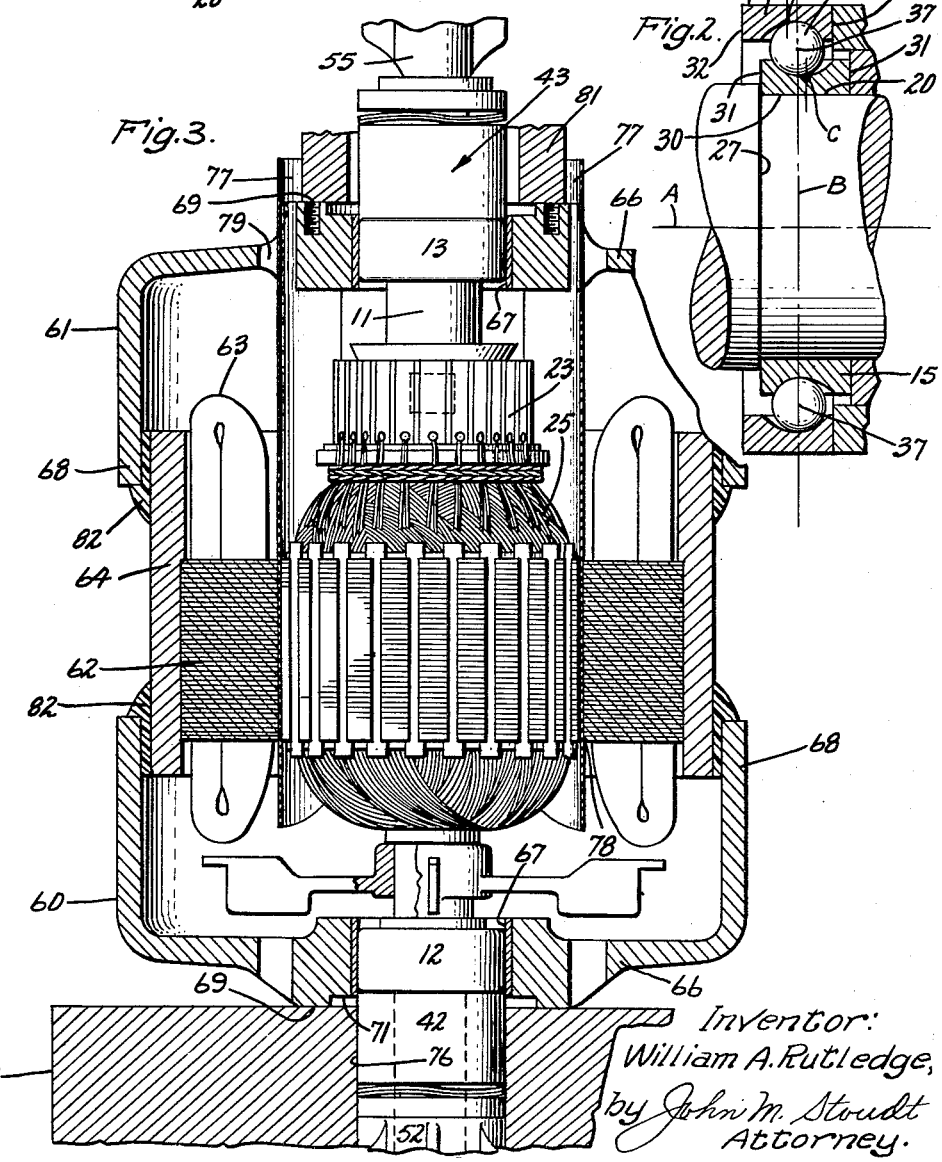
Fig.2.
Fig.3.
Inventor:
William A. Rutledge,
by John M. Stoudt
Attorney.

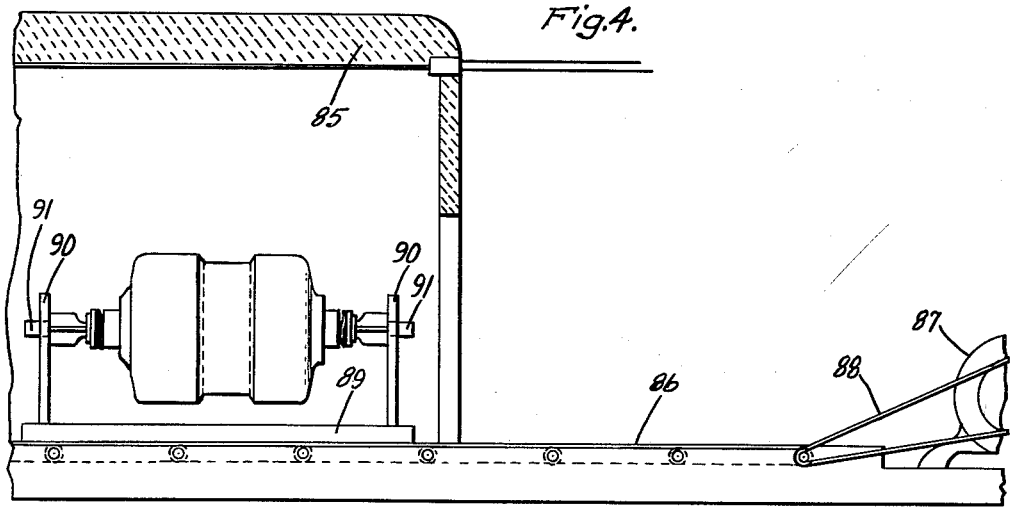
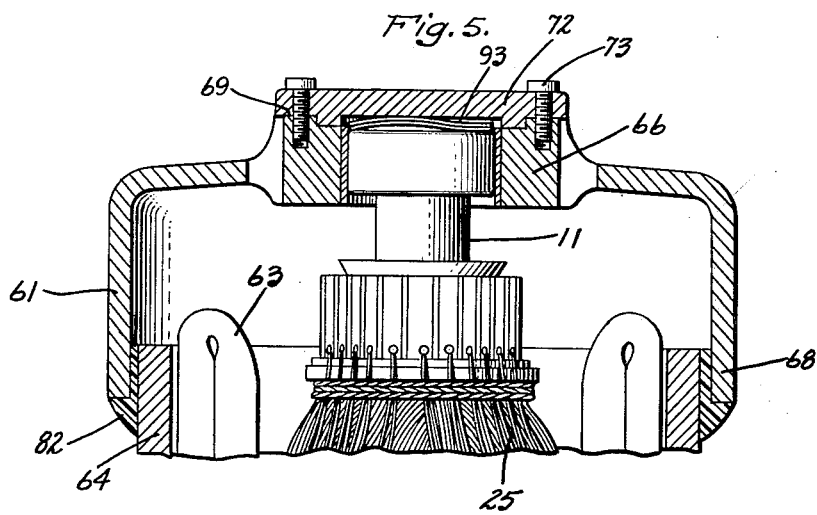

United States Patent Office 3,172,197
Patented Mar. 9, 1965

3,172,197
METHOD OF ACHIEVING ALIGNMENT OF BALL BEARINGS AND SHAFT COMPONENTS
William A. Rutledge, Fort Wayne, Ind., assignor to General Electric Company, a corporation of New York
Filed June 14, 1963, Ser. No. 287,851
7 Claims. (Cl. 29—404)

My invention relates generally to a method of assembling ball bearings and shaft with a supporting structure, and more particularly to such a method in the manufacture of dynamoelectric machines.

In the construction of certain dynamoelectric machines, such as small electric motors, the rotor carrying shaft is supported on either side of the rotor for rotation relative to the stator by a ball or roller type bearing mounted in the motor end shield. The inner race of the bearing usually has an interference fit with the shaft to revolve therewith while the outer race is normally mounted within a bearing accommodating recess in the end shield. It is extremely important that the races of the bearings be provided such that the balls of the bearings are permitted to revolve freely around the same axis at a substantially constant speed and radius, the line joining the centers of diametrically opposed balls being substantially normal to the axis of the shaft. Any interference with this type of ball rotation adversely affects motor performance and the operating life expectancy for satisfactory support of the rotatable member.

In order to achieve the aforedescribed critical freedom of rotation of the balls, it is necessary that a true coaxial relation between the corresponding races of the bearings be built into the machine. In addition, of equal importance is the provision of a radial or parallel relation between the centers of associated inner and outer raceways in each bearing. That is to say, lines drawn parallel to the accurately finished side surfaces of inner and outer races of a bearing and extending through the respective centers of the race ways should have a parallel or radially aligned relationship. The slightest variation in either of the two foregoing relationships rather drastically reduces the operating rotational life of the bearings. As an example, for a motor having ball bearings employing seven balls, $5/32$ of an inch in diameter which experiences ten pounds of both axial thrust and radial loads, misalignment of the components (whether radial or axial) beyond 0.06° will cause a sharp and pronounced decrease in the total expected operational longevity of the bearings.

Accordingly, it is the general object of the invention to provide an improved method of achieving alignment of ball bearing and shaft components when they are assembled into a supporting structure, and it is a more specific object to do so in the assembly of a dynamoelectric machine having rotatable members supported by ball bearings carried by the frame of the machine, the frame retaining the alignments in the assembled machine.

Another object of the present invention is the provision of an improved method for assembling a dynamoelectric machine, suitable for use in mass production manufacture, which provides the finally assembled machine with the desirable alignment and ball rotation relationships mentioned above.

It is a further object of the present invention to provide an improved method of manufacuring dynamoelectric machines employing ball bearings which consistently and economically of the mass production manufacture of such machines builds into the machine radial or parallel alignment between associated inner and outer bearing races, a true coaxial relationship between corresponding races with the shaft, and a predetermined spaced relationship between the stationary assembly and the rotatable member carried by the shaft.

In carrying out the objects of the present invention in one form, I provide an improved method of assembling a dynamoelectric machine having a stationary assembly, an armature, a shaft fixedly carrying the armature, and a pair of end frames each mounting a roller type bearing, during fabrication of the machine, I mount the inner races of each bearing firmly on the shaft, one on either side of the armature, preferably against a radial shaft surface. I establish a temporarily fixed coaxial relation between each of the inner and outer races of the bearing with the shaft while I hold the inner races against the radial surfaces. A temporarily fixed radial or parallel relationship between the associated inner and outer races of the respective bearings is also effected. In addition, the armature and stationary assembly are assembled in a predetermined spaced relation, that is, with a temporarily fixed uniform air gap being established. This step may, of course, be performed either before or after the bearing race components and the bearing-shaft relationships mentioned previously have been achieved. Thereafter, the bearing supports or end frames, with the outer races mounted therein, are connected to the stationary assembly while the previously established coaxial and radial relationships between the bearing races and shaft and the predetermined spaced relationship between the stationary assembly and the armature are maintained. Finally, the inner and outer bearing races and the armature and stationary assembly are released for relative rotation. As finally assembled, the end frames of the dynamoelectric machine retain the coaxial, radial, and predetermined relationships established during the steps of fabrication so that during machine operation the rollers are capable of revolving freely around the shaft axis with the type of desired rotation explained above.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings:

FIG. 1 is a partial side elevational view, in cross section, showing the preferred manner in which I initially establish both a predetermined radial alignment between the outer and inner races of two ball bearings after they have been assembled onto an armature carrying shaft as well as a parallel or coaxial relation between corresponding races of the respective bearings;

FIG. 2 is an enlarged view of the bearing shown on the right side of FIG. 1, illustrating the established relationships of the inner and outer races with respect to the shaft and to each other, with the axial displacement of the outer race being exaggerated for the sake of clarity;

FIG. 3 is an enlarged view of the right side of FIG. 1 showing the stationary member and end shields of the dynamoelectric machine of the exemplification being assembled with the machine parts seen in FIG. 1;

FIG. 4 is a side elevational view, partially broken away, illustrating the dynamoelectric machine components being maintained in their properly assembled relation as the end shields are being secured to the stationary member; and FIG. 5 is a partial side elevational view of the right side of the illustrated machine showing the securement of parts in the proper relation, with all assembly fixtures being removed.

Turning now to the drawings in more detail, for purposes of explanation and disclosure, the preferred embodiment or form of the invention has been illustrated in connection with the fabrication of a small horespower dynamoelectric machine of the series wound A.C.–D.C. type having a single output end shaft 11. In the present exemplification, as seen in FIG. 1, I initially mount a pair of conventional and commercially available identical ball bearings 12 and 13 on the shaft 11 after it has been machined into a finished part, and then establish a temporarily fixed predetermined relation between associated inner and outer races, 15 and 16, of each bearing as well as a coaxial relation between corresponding races of the respective bearings. The manner in which these relationships are established will become apparent from the following detailed description of the illustrated embodiment. Shaft 11, as pictured, includes ends 17, 18, with 17 being the output end having a threaded termination 19 for receiving a driving connection or the like. A pair of identically finished annular surfaces 20, made concentric with the shaft axis and coaxial with respect to each other, are accurately provided at each end of shaft 11 for mounting the inner bearing races 15 to rotate with the shaft, as by an interference fit therewith. Intermediate surfaces 20, the shaft has a section 21 of enlarged diameter fixedly supporting a standard armature 22 comprised of a commutator 23 and magnetic core 24 wound with coils 25. Vertical or radial shoulders 26, 27, furnished at each end of section 21 to meet surfaces 20, are accurately machined to provide a plane perpendicular with respect to the revolution axis of the shaft and surfaces 20.

As is customary, the inner race of the bearing includes an annular bore 30 to provide the interference fit with shaft surface 20, the side faces 31, 32 of the inner and outer races being made perpendicular to inner race bore 30 within close tolerances. A number of balls 34 conventionally support the inner and outer races for relative rotation. It will be seen from the discussion so far that when inner races 15 are attached to the shaft on surfaces 20 in abutting relation with vertical shoulders 26, 27, the inner races are in a true parallel or coaxial relation with respect to the rotation axis of shaft 11.

By an important aspect of the present invention, with the inner bearing races 15 positioned on shaft surfaces 20 with side faces 31 disposed firmly against the radial surfaces provided in the exemplification by shaft shoulders 26, 27, to provide a fixed coaxial relation with the shaft axis, I establish a temporarily fixed radial or parallel relation between the outer races and the shaft axis and maintain these relationships until the component parts of the machine have been secured together during subsequent steps of manufacturing. More specifically, for reasons of brevity and clarity, only the relationships in connection with bearing 12 will be explained in detail best shown in FIG. 2. With the coaxial relation of the inner race bore 30 determined as already set out, sides 31 define planes normal to the shaft axis, denoted by the letter "A." The outer race is then preferably preloaded a predetermined amount to displace the outer race axially toward armature core 24 (the displacement being exaggerated in FIGS. 1 and 2), sides 32 becoming radially aligned with or parallel to sides 31 of the inner race 15. Lines drawn parallel to these sides and extending through raceway centers "C" of the associated races will also assume the same parallel relation. This, in turn, provides the outer longitudinal surface 36 of the outer race generally coaxial with the shaft axis "A" and aligns all the balls 34, such that a line "B" drawn through the centers 37 of diametrically opposed balls will be perpendicular to the shaft axis "A." Consequently, all of the balls will have their centers at the same radial distance from the revolution center, shaft axis "A." In addition, when both bearings 12 and 13 have these relationships established, the corresponding races of each will be coaxial relative to one another.

In order to furnish the foregoing relationships on a temporarily fixed basis, in actual practice I have satisfactorily employed the fixtures shown in detail in FIG. 1, generally denoted by numerals 42 and 43. Each fixture includes identical, cooperating inner and outer sleeves 44, 45 with the inner sleeve adapted to have a slip fit with the ends of the shaft. These members are concentrically arranged and slidable independently of one another, with each having an end face formed perpendicular with the shaft axis and adapted to engage the sides of the respective races. Preferably the diameter of the outer sleeve is no larger than that of the outer race. For providing the predetermined displacement of associated races, member 45 is biased relative to member 44 by an annular spring 47 (e.g., Belleville type) disposed between a flange 48 projecting outward at the extreme end of inner sleeve member 44 and the outboard end of member 45. At the output end of the shaft, a winged nut 52 having an internally threaded recess 53 for engaging the threaded end 19 of shaft 11 may be conveniently used to hold inner sleeve member 44 lightly against inner race 15 which in turn is forced into firm abutment with shaft surface 26. The bias of spring 47, in contact with inner sleeve 44, determines the axial displacement of outer race 16 and the exact pre-load placed upon the bearing. At the other end 18 of the shaft, winged member 55 has a threaded projection 56 extending through flanged spacer 57 and into a complementing threaded shaft recess 58, performing the same function in regard to bearing 13 as that effected by winged nut 52. With the parts assembled in the manner clearly illustrated by FIG. 1, it will be appreciated that the bearing races, the armature core, and the shaft are held together as an integral sub-assembly unit, with the bearing races having the already described pre-selected relationships relative to the shaft axis A.

By an important feature of the present invention, the foregoing temporarily fixed bearing-shaft relationships are maintained during the subsequent attachment of the end frames, indicated in FIG. 3 by numerals 60, 61 which mount the outer races of the bearings, to the stationary assembly. As shown, the stationary assembly comprises a laminated magnetic core 62 carrying excitation windings 63, and an outer frame or shell 64. In the illustrated embodiment, each end frame or end shield is identically formed from cast material, such as aluminum, and includes a central bearing hub section 66 having an axial hole provided with a conventional outer race seating sleeve 67 press-fitted therein and an axially projecting flange section 68. The sleeve extends coaxial to the center of the hole and may be formed of any suitable material, such a brass. The outboard surface 69 is machined to provide a plane generally normal to the axis of the hole and has an annular recess 71 inwardly thereof for accommodating part of a closure cap or end plate 72 (FIG. 5) to be referred to hereinafter.

End shield 60 is arranged on a cylindrical holding block 75 with flange 68 projecting upright and with sleeve 67 in alignment with aperture 76 of the block, which is adapted to receive fixture assembly 42. The armature-fixture unit of FIG. 1 is then positioned in the holding block 75 in the manner seen in FIG. 3. That is, fixture 42 is passed through sleeve 67 until it is received in block aperture 76 and the outer race 16 of bearing 12 is seated within sleeve 67. It should be noted at this time that in view of the differences in the rate of thermal expansion in a plane normal to axis A, between sleeve 67 and the cast end shield 60 as compared with that of the outer race 16, I find it desirable to provide a race-sleeve fit at room temperature conditions which takes into account such differences. The type of fit for a given application will, of course, be dependent upon many factors, such as operating temperatures, materials employed for the cooperating parts involved, and the like. However, for many applications, a slip-fit at room conditions between race 16 and the supporting component; e.g. sleeve 67 in the illustrated embodiment, has proven to be entirely satisfactory in actual practice. As an example, with a bearing having a nominal outer diameter of ⅜ inch, the slip-fit may be in the range between 0.1–0.6 mil., the ideal relation being dependent upon the material used for sleeve 67.

With end shield 60 and the sub-assembly armature unit in place, I then establish a predetermined, temporarily fixed, spaced relationship between the armature and stator core 62. More specifically, the stationary assembly is lowered over the armature with a number of conventional shims 77 disposed in the air gap 78 provided therebetween to provide a concentric relation between the two cores. Flange section 68 of end shield 60 has its internal surface at the edge in spaced, telescoping relation with respect to the external surface of shell 64 when these members assume their finally assembled respective positions. Once the stationary assembly has been disposed in the manner shown in FIG. 3, the upper end shield 61 (as viewed in that figure) is lowered in place until its sleeve 67 accommodates the outer race of bearing 13. Holes 79 formed adjacent the bearing hub section 66 permit the shims to extend outwardly of the end shield for ease in subsequent removal of the shims from the air gap. A pressure sleeve 81 vertically movable may be utilized against surface 69 to correctly position the sleeve over the outer bearing race. Flange section 68 of the upper end frame includes the same telescoping relation with stationary assembly as that for end shield 60 when finally assembled.

It is convenient at this time to apply structural bonding material 82 in a plastic or unhardened state to the spaces provided between the adjacent, telescoping parts of each end shield and shell 64. The application may be accomplished by any desirable means, such as the introduction of the material under pressure. Of course, it will be obvious to those skilled in the art that structural adhesive material 82 could equally as well be applied either to the desired portion of the outer periphery of the stationary assembly or to a portion of the internal inner surface of end shield flange 68, or to both locations before assembly of the parts.

For the adhesive bonding material 82 of the illustrated connection, I prefer to employ a thermosetting epoxy resin which is substantially non-shrinking from the unhardened to the hardened state. In its unhardened state it should be sufficiently fluid to permit the requisite motion of the end shield relative to the stationary assembly during the assembly procedure outlined above without breaking the adhesive bond existing between the material and the adjacent frame surfaces. For this purpose I have satisfactorily employed an epoxy resin known as EA-200, commercially available from Co-polymers Chemical Inc., of Livonia, Michigan.

It should be observed at this point that all of the component motor parts shown in FIG. 3 are disposed in their finally assembled relation, that is, with the inner and outer races of each bearing being maintained in the preselected temporarily fixed coaxial and radial relationships relative to the shaft axis A (see FIG. 2) and the stator and armature being assembled in a predetermined spaced relationship, the relationship also being temporarily fixed relative to axis A. Since, as explained previously, it is important that these temporarily fixed relationships be held during the attachment of the end frames, those skilled in the art will recognize that in order to furnish the motor components in the assembled relation seen in FIG. 3, the assembly procedure set out above may be varied without departing from the scope and spirit of the invention. For example, prior to temporarily fixing the shaft-bearing race relationships revealed in FIGS. 1 and 2, the outer races 16 of the bearings could be seated in sleeves 67 carried by end frames 60 and 61 after the stationary assembly and armature have been assembled in their predetermined spaced temporarily fixed relationship. Thereafter, assembly fixtures 42 and 43 could be connected to the shaft at either end of the armature to establish the desired coaxial and radial relationships of the bearing races relative to shaft axis A. The end frames could then be attached to the stationary assembly, by hardening or curing material 82.

This curing step may be achieved by any suitable means, such as by the application of heat provided by the equipment shown in FIG. 4. The illustrated equipment includes a standard kiln 85 and a belt conveyor 86 which is driven by an electric motor 87 and pulley means 88. The conveyor transports the motor of FIG. 3 through the kiln at a regulated rate to set up or harden the bonding material 82.

During the curing operation, I prefer to support the finally assembled motor components such that the center of gravity of each end shield in effect passes through the confines of the interference engagement between inner race 15 of each bearing and finished surface 20 of shaft 11. I obtain best results by following this procedure; this may be due to the fact that the mass of the end shield is being supported through the intermediaries of the bearing and shaft which are held stationary with respect to one another, and there is little chance for the creation of a torsional movement around either end of the bearings 12 and 13 which might otherwise be of sufficient magnitude to cock the outer races relative to sleeve 67. This cocking could very easily destroy the alignment achieved by the previous steps of manufacture, the outer races applying pressure on the balls to change their rotational relation from that described in connection with FIG. 2.

Thus, for purposes of disclosure I have used a motor in which the center of gravity is assumed to pass through surface 20 when the motor of the exemplification is held with its shaft axis A in a horizontal position. As shown in FIG. 4, this may be readily accomplished by a generally U-shaped holder 89 having upright arms 90 each provided with a slot to receive extensions 91 projecting from the respective fixture assemblies 42 and 43.

Once material 82 has been hardened and the end shields 60 and 61 have been rigidly connected to the stationary assembly, assembly fixtures 42 and 43 may be removed from the respective ends of shaft 11 and an annular thrust receiving member, such as a common Belleville spring 93 in FIG. 5, may be positioned at the outboard end of each outer race 16. End plate 72 may then be secured, as by bolts 73, on to surface 69 of bearing hub section 66 to close the end of the bearing housing hub. In the output end of the motor (not shown), the plate must, of course, include an opening to permit output shaft end 17 to project beyond the confines of the motor. Finally, shims 77 may be removed from the air gap by merely pulling them outwardly through end frame holes 79 to release the armature and stator for relative rotation. The removal of assembly fixtures 42 and 43 and shims 77 from the motor, release the associated inner and outer races of the bearings for relative rotation with the relationships established during the previous step of manufacture, all relationships being retained by end shields 60 and 61 for the operative life of the motor. In the finally assembled machine, the balls are thus capable of revolving around shaft axis A and perpendicular line "B" (FIG. 2) or a line parallel to it without being subject to a pressure type of interference which would adversely affect this desirable type of rotation.

It will be appreciated from the foregoing that the present method provides in the finally constructed machine an accurate coaxial alignment between each of the bearing races and the armature shaft as well as a true radial or parallel relationship between associated inner and outer bearing races which can be built into the machine for its operation life. In addition, the present invention insures that these relationships will not be subsequently destroyed during operation of the machine even though the bearing housing, which seats the outer races, changes dimensions in a radial plane at a different rate than that of the outer bearing race itself. Moreover, a closely controlled air gap is furnished between the armature and the stator. The procedure is not only adaptable for use in a mass production manufacture of machines but also provides a minimum variation of bearing-shaft alignment qualities between individual machines so constructed at a relatively low unit cost.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A method of assembling a dynamoelectric machine having a stationary assembly, a rotatable member, a shaft fixedly carrying said member, and a pair of end frames each mounting a roller type bearing formed with radially spaced apart inner and outer races and roller elements arranged therebetween, the method comprising the steps of establishing a temporarily fixed coaxial relation between each of said inner and outer races with said shaft carrying said rotatable member and a temporarily fixed radial relation between the associated inner and outer races of each bearing; assembling the rotatable member and stationary assembly in a predetermined spaced relationship, with said end frames being arranged next to said stationary assembly with said outer races mounted in said end frames, and with unhardened adhesive bonding material disposed between and in engagement with the end frames and said stationary assembly; hardening said adhesive bonding material while maintaining the previously established coaxial and radial relationships between the bearings and shaft and the predetermined spaced relationship between the stationary assembly and the rotatable member; causing the inner and outer bearing races and the rotatable member and stationary assembly to be released for relative rotation, said end frames retaining said previously established coaxial, radial, and predetermined relationships in the dynamoelectric machine.

2. A method of assembling a dynamoelectric machine having a stationary assembly, a rotatable member, a shaft fixedly carrying said member, and a pair of end frames each mounting a roller type bearing formed with radially spaced apart inner and outer races and roller elements arranged therebetween the method comprising the steps of establishing a temporarily fixed coaxial relation between each of said inner and outer races with said shaft carrying said member and concurrently effecting a temporarily fixed radial and axially pre-loaded relationship between the associated inner and outer bearing races; assembling the rotatable member and stationary assembly in a predetermined spaced relationship; with said end frames being arranged adjacent said stationary assembly with unhardened thermosetting epoxy resin disposed in engaging relation with the end frames and stationary assembly, and with said outer races being mounted in the end frames; hardening said epoxy resin while maintaining the previously established coaxial and radial relationships between the bearings races and shaft, and the predetermined spaced relationship between the stationary assembly and the rotatable member; causing the inner and outer bearing races and the rotatable member and stationary assembly to be released for relative rotation, said end frames permanently retaining said previously established coaxial, radial, and predetermined spaced relationships for the operating life of the machine.

3. A method of assembling a dynamoelectric machine having a stationary assembly, a rotatable assembly having a shaft, and at least one end frame mounting a roller type bearing formed with radially spaced apart inner and outer races having raceways carrying roller elements, the method comprising the steps of mounting one of the bearings firmly on said shaft and establishing a temporarily fixed coaxial relation between selected surfaces of associated inner and outer races with the rotational axis of said shaft while effecting a predetermined fixed radial relationship between raceways of associated inner and outer races and preloading the associated races a preselected amount to initially displace them in axial direction; assembling the rotatable and stationary assemblies in a predetermined spaced relationship; and attaching said end frame to said stationary assembly with the other of the races of the same bearing being mounted in the end frame, while maintaining the previously established coaxial and radial relationships and the predetermined spaced relationship between the assemblies; and causing respectively the inner and outer bearing races, and the rotatable and stationary assemblies to be released for relative rotation, with said end frames retaining said previously established coaxial, radial, and predetermined relationships in the dynamoelectric machine.

4. A method of assembling a dynamoelectric machine having a stationary assembly, a rotatable assembly, and at least one end frame mounting a roller type bearing formed with radially spaced apart inner and outer races having roller elements arranged therebetween, the method comprising the steps of establishing a temporarily fixed coaxial relation between preselected axially extending surfaces of associated inner and outer races with the rotational axis of said rotatable assembly, with associated races being pre-loaded a preselected amount; assembling the rotatable and stationary assemblies in a predetermined spaced relationship; attaching said end frame to said stationary assembly, with said outer race of each bearing being mounted in an end frame, while maintaining the previously established coaxial and predetermined spaced relationships between the associated bearing races and rotatable assembly and between the stationary and rotatable assembly; and causing the associated inner and outer bearing races, and the rotatable and stationary assemblies to be released for relative rotation with said end frame retaining said previously established coaxial and predetermined relationships in the dynamoelectric machine.

5. A method of assembling a dynamoelectric machine having a stationary assembly, a rotatable assembly including a pair of accurately formed radial surfaces disposed in spaced relation and facing away from one another, and a pair of end frames each mounting a roller type bearing formed with radially spaced apart inner and outer races and having roller elements arranged therebetween, the method comprising the steps of positioning said inner races of each bearing on said rotatable assembly near the associated radial surface; holding said inner races firmly against said associated radial surfaces and biasing said outer races toward each other with a predetermined load to effect a temporarily fixed coaxial predetermined relationship between preselected surface of said inner and outer races respectively with the rotational axis of said rotatable assembly while concurrently establishing a preselected radially aligned relationship between each associated inner and outer bearing race; assembling the rotatable and stationary assemblies in a predetermined spaced relationship with respect to one another; connecting said end frames to said stationary assembly, with said outer races being mounted in the end frames, while maintaining the previously established temporarily fixed coaxial and radial aligned relationships of the bearing races and rotatable assembly, and the predetermined spaced relationship between the rotatable and the stationary assemblies; the end frames retaining said relationships in the dynamoelectric machine.

6. A method of assembling a machine including a rotatable assembly, a stationary assembly, and at least one bearing support attached to the stationary assembly mounting a roller type bearing formed with radially separated inner and outer races having roller elements disposed therebetween, the method comprising the steps of: establishing a temporarily fixed, coaxially aligned, relation between preselected surfaces of said inner and outer races respectively with the rotational axis of said rotatable assembly with one of said races being carried by said rotatable assembly, with the other race of the same bearing being mounted in said bearing support with a section of the bearing support being disposed next to a section of the stationary assembly, and with unhardened adhesive material engaging the adjacent sections; fixedly attaching said bearing support to said stationary assembly by hardening the adhesive material while maintaining the previously established coaxial relationships; and causing the inner and outer bearing races to be released for relative rotation, said bearing support retaining said previously established coaxial relationships in the machine.

7. A method of assembling a machine including a rotatable assembly, a stationary assembly, and at least one bearing support connected to the stationary assembly mounting a roller type bearing formed with radially separated inner and outer races each having raceways with roller elements disposed therebetween, the method comprising the steps of: establishing a temporarily fixed coaxial aligned relation between the axially extending peripheries of the respective inner and outer races of each bearing with the axis of said rotatable assembly, with said inner races being carried by said rotatable assembly while effecting a preselected relationship between the raceways of associated races; mounting said outer race in said bearing support, with a section of the bearing support being disposed adjacent a section of the stationary assembly and having unhardened adhesive material engaging the adjacent sections; fixedly connecting said bearing support to said stationary assembly by hardening the adhesive material while maintaining the previously established coaxial and preselected raceway relationships; and causing the inner and outer bearing races to be released for relative rotation, said bearing support retaining said previously established coaxial and preselected raceway relationships in the machine.

References Cited by the Examiner
UNITED STATES PATENTS

| 2,423,750 | 7/47 | Benson. | |
|---|---|---|---|
| 2,453,297 | 11/48 | Benson. | |
| 2,734,258 | 2/56 | Shultz | 29—404 |
| 2,759,243 | 8/56 | Smith. | |
| 2,965,954 | 12/60 | Baker | 29—404 |
| 3,002,261 | 10/61 | Avila et al. | |
| 3,050,832 | 8/62 | Scheldorf. | |

References Cited by the Applicant
UNITED STATES PATENTS

| 1,444,751 | 2/23 | Mueller. |
|---|---|---|
| 2,236,956 | 4/47 | Van der Heem. |
| 2,668,925 | 2/54 | Bloser. |
| 2,677,065 | 4/54 | Van der Heem. |
| 2,852,838 | 9/58 | Krutmeijer. |
| 2,956,632 | 10/60 | Forbush et al. |
| 3,056,636 | 10/62 | Mims. |

WHITMORE A. WILTZ, *Primary Examiner.*
THOMAS H. EAGER, *Examiner.*